Oct. 30, 1962    E. J. BARTH    3,061,058
CLUTCH AND TRANSMISSION CONTROL SYSTEM
Filed Dec. 28, 1959
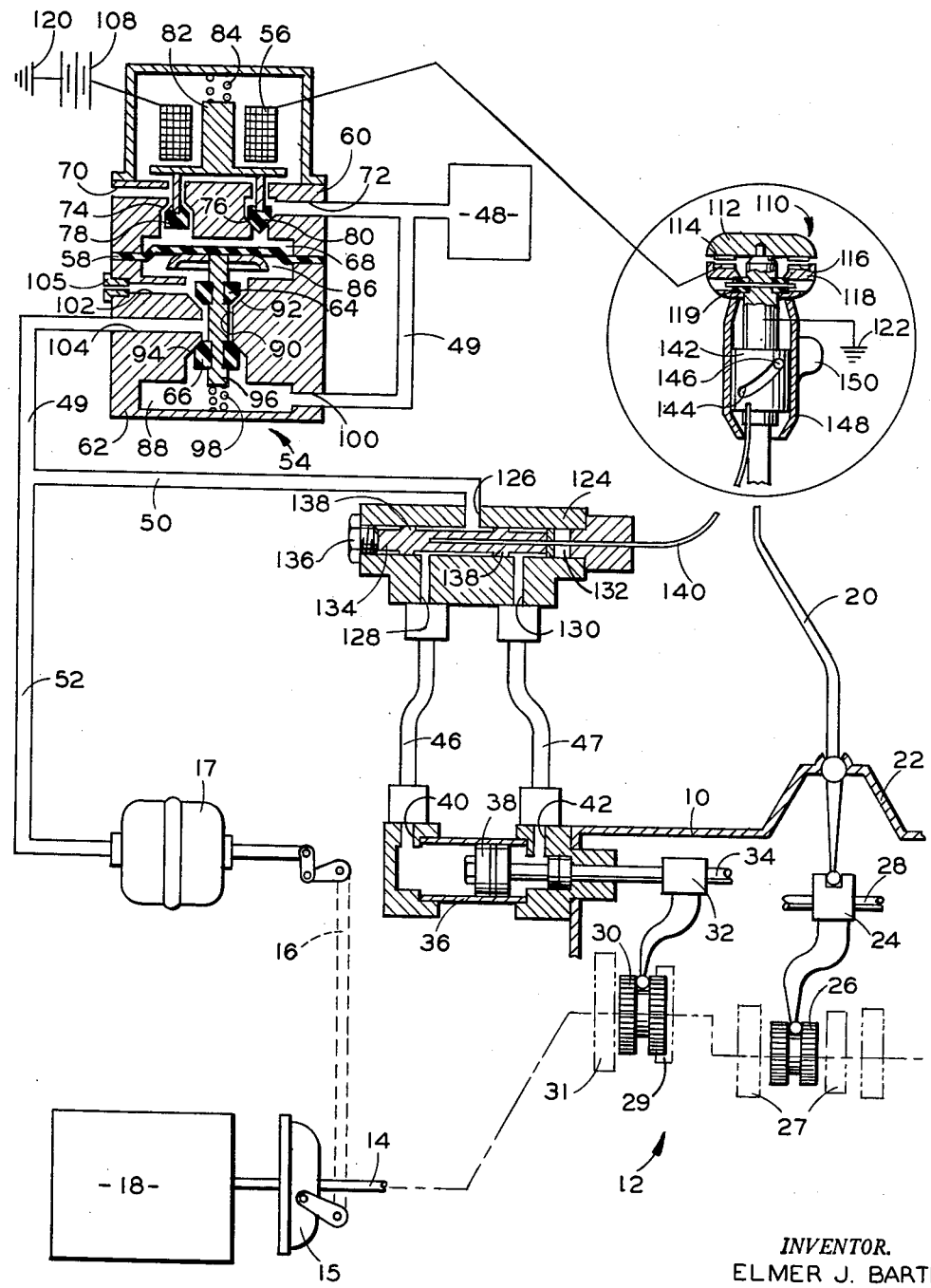
INVENTOR.
ELMER J. BARTH
BY
*Walter E. Pavlick*
ATTORNEY United States Patent Office 3,061,058
Patented Oct. 30, 1962

3,061,058
CLUTCH AND TRANSMISSION CONTROL
SYSTEM
Elmer J. Barth, Toledo, Ohio
Filed Dec. 28, 1959, Ser. No. 862,384
8 Claims. (Cl. 192—3.5)

This invention relates to a control system for the drive mechanism of a vehicle and, more particularly to a means for controlling the vehicle clutch in conjunction with the shifting of speed ratios in the vehicle transmission.

It has heretofore been a common expedient in vehicles to provide a shift lever switch for disengaging and re-engaging the master or engine clutch.

It has also been a common expedient in vehicles to employ an automatic mechanism for shifting speed ratios in a transmission in response to entry of the shift lever into neutral position or upon depressing of the master clutch foot pedal.

However, the prior art devices have a common disadvantage, that is, the complete shifts still have not been made quickly and without appreciable loss of vehicle speed.

It is an object of this invention to provide a control system wherein a single simple operation will energize the disengagement of the master clutch and effect shifting to a preselected speed ratio.

It is another object of this invention to reduce the use of a clutch foot pedal in vehicle operation.

These and other objects and advantages will become apparent from the following detailed description, which constitutes one preferred embodiment of this invention, when taken in connection with the accompanying drawing which is a diagrammatic illustration of the control system embodying this invention.

Referring more particularly to the drawing, a gear box or transmission case 10 houses a change speed gear group indicated generally at 12. Obviously the change speed gear group 12 may be divided and placed in separate casings to constitute what is generally referred to as main and auxiliary transmissions. Power is imparted to the change speed gear group through a drive shaft 14 which mounts a normally engaged master or engine friction clutch 15 of a driving means or engine 18. A suitable linkage 16 connects the master clutch 15 to an air cylinder 17 which is operable to disengage the clutch.

For the manual selection of certain gear ratios in the transmission, a standard shift lever 20 is universally mounted in the top of a domed portion 22 of the transmission case 10. The lower portion of shift lever 20 extends within the transmission case 10 and is received in a socket of a shifting fork 24. The shifting fork 24 is provided with an arm extending downwardly therefrom and received by a toothed clutch member 26. The shifting fork 24 is secured on a slidably mounted shifting rod 28 to move the toothed clutch 26 axially into engagement with one of a plurality of change speed gears 27 in a manner well known in the art.

Another shiftable toothed clutch 30 is provided in the transmission case 10 and is adapted to engage one of a pair of change speed gears 29 and 31 which are disposed on either side thereof to split or double the speed ratios obtainable through the manual clutch 26. The shiftable toothed clutch 30, like clutch 26, is moved by a shifting fork 32. The shifting fork 32 is fixedly attached to a shifting rod 34 which is slidably mounted for axial movement in the transmission case 10. The outer end of the shifting rod 34 extends within an air cylinder 36 mounted on the transmission case 10 and has a piston head 38 mounted thereon for confined movement in the air cylinder. The air cylinder 36 is provided with parallel transverse passages 40, 42 extending through the upper portion thereof for communication with either side of the piston head 38. The passages 40, 42 are adapted to receive air through conduits 46, 47 respectively to cause reciprocal movement of the piston 38 and consequent shifting of the toothed clutch 30.

Controllable power means is provided to effect disengagement of the master clutch 15 and shifting of clutch member 30. The controllable power means includes the power cylinders 17 and 36 and a suitable source 48 of air pressure connected to the power cylinders 17 and 36 by an appropriate conduit means. The conduit means takes the form of a main conduit 49 leading from the source 48 to a junction from which a branch conduit 50 leads to the air cylinder 36 and another branch conduit 52 leads to the master clutch air cylinder 17.

Means is provided to control the air flow through conduit 49 and thus control operation of power cylinders 17 and 36. More particularly, an electrically energized three-way control valve 54 is provided with a solenoid 56 for controlling a power element 58. The control valve 54 includes an intermediate valve body 60 for housing the power element 58 and a lower valve body 62 for housing valve members 64 and 66.

The intermediate valve body 60 is provided with a power chamber 68 defined by the power element 58, which takes the form of a flexible diaphragm, and the valve body 60. The valve body 60 includes an upper vent port 70 for venting the power chamber 68 to the atmosphere, and an inlet port 72 communicating with fluid pressure conduit 49. The vent port and inlet port are provided with seats 74 and 76 for engagement with valve members 78 and 80, respectively, which are secured to one end of an armature 82 of the solenoid 56. The solenoid 56, which is normally de-energized, moves the valve members 80 and 78 upwardly upon energization to seat valve member 78 in its seat 74, thereby cutting off the power chamber 68 from vent port 70 and the atmosphere. The other valve member 80 is simultaneously moved from its seat 76 and puts the power chamber 68 into communication with the air pressure source 48. A coil spring 84 engaging the other end of the armature 82 returns the same and the valve members 78 and 80 to their normal position when the solenond 56 is de-energized, thus cutting off the pressure from inlet port 72 and venting the power chamber 68 to the atmosphere.

The lower valve body 62 is provided with upper and lower compartments 86 and 88, respectively, which are connected together by a duct 90. The upper compartment 86 is defined by the power element 58 and the valve body 62. The duct 90 is provided with a pair of seats 92 and 94 adapted to receive the upper and lower valve members 64 and 66, respectively, which are secured to a valve rod 96. The valve rod 96 is in contact with the power element 58 at its one end and with a spring 98 at its opposite end. The power element 58 moves the valve members 64 and 66 in one direction only. With the power chamber 68 vented to the atmosphere, the spring 98 causes the lower valve member 66 to engage its seat 94, thereby cutting off the direct source of air pressure from an inlet port 100, which is in communication with the lower compartment 88. The upper valve member 64 being simultaneously unseated, allows an exhaust port 102, which is connected to the upper compartment 86, to be in communication with an outlet port 104, which is connected to conduit 49, thereby bleeding branch conduits 50 and 52. An orificed plug 105 is provided in exhaust port 102 to control the bleeding. When the solenoid 56 is energized, the power element 58 moves downwardly, seating the upper valve member 64 and unseating the lower valve member 66, thereby putting the inlet port 100 in communication with the outlet port 104, to supply air pressure through conduit 49 to branch conduits 50 and 52.

Means is provided for actuating the control valve 54. To this end a suitable source of electric power 108 and a control switch 110 are serially connected to the solenoid 56. For convenience, the control switch 110 is positioned on the upper end of the shift lever 20 and takes the form of a split shift knob having an upper member 112 securely mounted on the shift lever 20. A contact ring 114 is secured to the upper member 112 and is adapted to engage a contact ring 116 attached to a lower member 118. The lower member 118 is rockably mounted on shift lever 20 by an annular resilient member 119. Rocking movement of the lower member 118 causes engagement of contact rings 114 and 116 to complete the valve control circuit as follows: from ground at 120 through the power source 108, solenoid 56, and control switch 110 to shift lever 20 and eventually to ground at 122.

Means is provided for controlling the path of fluid flow from the power source 48 to the air cylinder 36 and thus the shifting of clutch 30. This means includes a casing 124 having an inlet 126, which receives branch conduit 50, and a pair of parallel outlet passages 128 and 130 which receive conduits 46 and 47 respectively. As previously pointed out, conduits 46 and 47 communicate with opposite sides of piston head 38 positioned in air cylinder 36. The casing 124 is provided with a longitudinal opening 132 to which inlet 126 and outlet passages 128 and 130 communicate at right angles. A slide valve 134 is reciprocally received by the opening 132 and is enclosed therein by a screw 136 positioned in the end of the opening. The slide valve 134 is provided with a pair of spaced annular ribs 138 which snugly but slidably engage the walls of opening 132. The spacing of the ribs 138 is such that when the slide valve 134 is in its extreme leftward position, an annular passage defined by the ribs 138, slide valve 134, and the wall of opening 132 communicates inlet 126 with outlet passage 128. Likewise, when the slide valve 134 is in its extreme rightward position, the annular passage communicates inlet 126 with outlet passage 130.

Means is provided to move the slide valve 134 to one or the other of the above positions. To this end a cable 140 extends through the casing 124 and has an end fixedly attached to the slide valve 134. The other end of cable 140 is attached to a sleeve 142 which is movably positioned below the shift lever knob. The sleeve 142 is provided with a spiral groove 144 which slidably receives a small cam member or ball 146. The cam ball 146 is secured to an outer rotatably mounted housing 148. The housing 148 is restrained from axial movement and has an operating tab 150 extending outwardly therefrom. Thus, it is apparent that when the housing 148 is rotated by means of tab 150, cam ball 146 causes sleeve 142 to move axially to position the slide valve 134 in either of its two operating positions.

Referring now to the operation. inasmuch as the change speed gear group 12 is a diagrammatic illustration of a conventional gear group, its operation will be understood without description. The alternate engagement of change speed gears 27 within the transmission case 10 is accomplished in the conventional manner by means of shift lever 20.

After the shift lever 20 has been manually operated to place the starting gear in driven relationship to drive shaft 14 and as the vehicle is gathering speed, the operator rotates shift lever housing 148 by finger tip engagement with tab 150 to slide valve 134 to the right so that air is free to flow through conduit 47 to piston head 38.

To shift the gear group 12 to the second speed ratio, the operator merely grasps the lower member 118 of the shift knob to close contacts 114 and 116 and complete the electric circuit as above described to actuate solenoid 56. Actuation of the solenoid 56 moves armature 82 upwardly to seat valve 78 and unseat valve member 80 thereby subjecting power chamber 68 to air pressure of source 48. Thus, power element 58 is moved downwardly to seat valve member 64 and unseat valve member 66 thereby permitting free flow of the air under pressure through conduit 49. The flow of air continues from conduit 49 through branch conduit 52 to cause actuation of the power cylinder 17 and hence disengagement of the master or engine clutch 15. Simultaneously with disengagement of master clutch 15, air flows from conduit 49 through branch conduit 50, past slide valve 134, through conduit 47 and subsequently to piston head 38 within air cylinder 36. Since the right side of piston head 38 is now subjected to the pressure of the air source 48, piston head 38 will be moved to the left causing disengagement of toothed clutch 30 from gear 29 and engagement with gear 31 as soon as the clutch 15 has been disengaged to remove the load from the clutch 30. Since the master clutch 15 is disengaged and the change speed gear group 12 is shifted, it is apparent that the speed of the vehicle will not have retarded beyond the point at which engagement of the gears in the new shift position can be made.

When the shift knob control switch 110 is released, solenoid 56 is de-energized thus seating valve member 80 and unseating valve member 78 to open power chamber 68 to the atmosphere through vent port 70. Now, coil spring 98 urges rod 96 upwardly to seat valve member 66 and unseat valve member 64. Since valve member 64 is unseated, the power cylinder 17 will be bled through branch conduit 52, conduit 49, control valve outlet 104, past valve member 64, and through the clutch retarding orifice plug 105 to the atmosphere. Air is also bled from the right of piston head 38, through conduit 47, past slide valve 134, through branch conduit 50, conduit 49, to the control valve 54 and likewise through orificed plug 105 to the atmosphere.

The third ratio in the speed progression is obtained by preselective movement of tab 150 to its original position. This effects movement of the slide valve 134 to its extreme leftward position as illustrated in the drawing to communicate inlet 126 with outlet passage 128. Thus, air is free to flow through conduit 46 to the left side of piston head 38. The shift knob control switch 110 is again actuated to permit air flow to the power cylinders 17 and 36, thereby effecting disengagement of the master clutch 15 and return of the toothed clutch 30 into engagement with gear 29. The shift lever 20 is then manually operated to move toothed clutch 26 into engagement with the next change speed gear. Upon release of the shift knob control switch 110, the master clutch 15 is again re-engaged. The above operations are successively repeated to obtain further ratios as the particular transmission permits. It is apparent that the foregoing permits double shifts or gear skips merely by omitting operation of the preselection tab 150. When the preselection tab 150 is not operated, the toothed clutch 30 is not shifted upon actuation of the control switch 110, hence, the change in speed ratios is obtained merely through operation of the manual shift lever 20 and toothed clutch 26.

While the control system embodying this invention has been described with particularity, it is apparent that there may be many changes in structure as well as operation without departing from the scope of this invention as defined by the appended claims.

I claim:

1. In a control system the combination comprising a change speed gear group, a shift lever controlling certain of said change speed gears, clutch means for connecting said change speed gear group to a driving means, controllable means for automatically disengaging said clutch means and shifting the other change speeds gears, a pair of control means for said controllable means, one therof being manually preselectable into and out of shift effecting position and the other thereof being actuatable to a position for effecting disengagement of said clutch means and shifting of said other change speed gears, and actuating means on said shift lever for operating said other control means to disengage said clutch means and shift said other change speed gears upon appropriate preselection of said one control means.

2. In a control system, the combination comprising a first shiftable group of gears having a shift lever operatively connected thereto, a second shiftable group of gears operatively connected to said first group of gears, a first fluid actuated means operably associated with said second group of gears, a preselect means associated with said first fluid actuated means for controlling the operation thereof, a clutch means adapted to connect said groups of gears to a driving means, a second fluid actuated means operably associated with said clutch means, and control means including a source of fluid pressure and an actuating means on said shift lever for controlling said first and second actuating means whereby disengagement of said clutch means and shifting of said second gear group is effected.

3. In a control system, the combination comprising a first shiftable gear having a shift lever operatively connected thereto, a second shiftable gear operatively connected to said first gear, a first fluid actuated means for shifting said second shiftable gear, preselect means directing the fluid flow to said first fluid actuated means thereby selecting the operation thereof, a clutch means adapted to connect said first and second gears to a driving means, a second fluid actuated means for operating said clutch means, and control means for controlling said first and second actuating means, said control means including a source of fluid pressure, an electric control circuit, an electrically operated valve for controlling said fluid pressure and a manually actuated switch positioned on said shift lever and in said circuit determining the operation of said last named valve.

4. In a control system the combination comprising a change speed gear group having a shift lever, clutch means for connecting the gear group to a driving means, conduit means for supplying a fluid pressure to effect disengagement of said clutch means and shifting of said change speed gear group, means controlling fluid pressure in said conduit means, actuating means disposed on said shift lever and being operable to control operation of said control means, and preselect means controlling fluid flow in said conduit means whereby operation of said preselect means followed by operation of said actuating means will effect disengagement of said clutch means and shifting of said gear group.

5. In a control system the combination comprising a change speed gear group having a shift lever, clutch means for effecting connection of said gear group to a driving means, controllable means for automatically disengaging said clutch means and shifting said gear group, said controllable means including a source of fluid pressure, a pair of control valves for said controllable means, actuating means at said shift lever for controlling one of said control valves to effect disengagement of said clutch means, preselectable means including operating means at said shift lever for controlling operation of said other control valve whereby operation of said preselectable means followed by actuation of said actuating means effects disengagement of said clutch means and shifting of said gear group.

6. In a control system the combination comprising a change speed gear group, clutch means for connecting the gear group to a driving means, a source of fluid under pressure, fluid actuated means connected to said source and operable to effect disengagement of said clutch means and shifting of said gear group, valve means controlling the flow of pressure fluid to said fluid actuated means, electrically responsive means controlling the position of said valve, and a circuit including a source of electric power for energizing the same, and a manually actuatable switch in said circuit determining operation of said electrically responsive means.

7. In a control system the combination comprising a change speed gear group having a manually operable shift lever for effecting shifting to certain speed ratios and having a pressure actuated clutch operating means for shifting to other speed ratios, a pressure actuated master clutch means for connecting the gear group to a driving means, a source of fluid under pressure, conduit means connecting both said pressure actuated means to said source, a valve in said conduit means controlling the flow of fluid to both said pressure actuated means, a solenoid controlling the position of said valve and a circuit including a source of electric power for energizing the same, a manually operable switch in said circuit and disposed on said shift lever, said switch being operable to effect disengagement of said master clutch means and shifting to said other speed ratios of said gear group.

8. The combination of claim 7 including a valve in said conduit means for controlling fluid flow to said pressure actuated gear group clutch means only, and operating means for said valve positioned on said shift lever whereby said other speed ratios of said gear group are or are not shifted upon operation of said switch at the will of the operator.

References Cited in the file of this patent

UNITED STATES PATENTS

| | | |
|---|---|---|
| 1,119,364 | Morden | Dec. 1, 1914 |
| 2,640,374 | Willis | June 2, 1953 |